United States Patent
Sharda et al.

(10) Patent No.: US 12,279,545 B2
(45) Date of Patent: Apr. 22, 2025

(54) AUTOMATIC SYSTEM FOR MEASURING SPACING, DEPTH, AND GEOLOCATION OF SEEDS

(71) Applicant: Kansas State University Research Foundation, Manhattan, KS (US)

(72) Inventors: Ajay Sharda, Manhattan, KS (US); Sylvester Badua, Manhattan, KS (US); Daniel Flippo, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 637 days.

(21) Appl. No.: 17/630,206

(22) PCT Filed: Jul. 24, 2020

(86) PCT No.: PCT/US2020/043387
§ 371 (c)(1),
(2) Date: Jan. 26, 2022

(87) PCT Pub. No.: WO2021/021594
PCT Pub. Date: Feb. 4, 2021

(65) Prior Publication Data
US 2022/0279704 A1 Sep. 8, 2022

Related U.S. Application Data

(60) Provisional application No. 62/879,169, filed on Jul. 26, 2019.

(51) Int. Cl.
*A01C 7/10* (2006.01)
*A01B 79/00* (2006.01)
(Continued)

(52) U.S. Cl.
CPC ............ *A01C 7/105* (2013.01); *A01B 79/005* (2013.01); *A01C 5/062* (2013.01); *A01C 5/066* (2013.01);
(Continued)

(58) Field of Classification Search
CPC ......... A01C 7/105; A01C 5/062; A01C 5/066; A01B 79/005; A01B 79/02
See application file for complete search history.

(56) References Cited

U.S. PATENT DOCUMENTS

| 5,936,234 A | 8/1999 | Thomas et al. |
| 7,726,251 B1 * | 6/2010 | Peterson ................ A01C 7/102 |
| | | 111/900 |

(Continued)

OTHER PUBLICATIONS

International Search Report and Written Opinion in corresponding PCT/US2020/43387, dated Oct. 30, 2020.

*Primary Examiner* — Jamie L McGowan
(74) *Attorney, Agent, or Firm* — Hovey Williams LLP

(57) ABSTRACT

A system for measuring real-time seed placement of seeds, such as corn seeds, during planting wherein the sensing and measurement (SAM) system comprises various elements selected from the group consisting of a high-speed camera, light-section sensor, potentiometer, GPS unit, data acquisition system, and a control computer. The SAM system measures seeding depth, seed spacing, and geo-location of the seed. It is mounted on a planter row unit located in between the closing wheels and the gauge wheels with the camera and light section sensor directly facing the furrow.

9 Claims, 12 Drawing Sheets

(51) Int. Cl.
*A01C 5/06* (2006.01)
*G05B 19/4155* (2006.01)

(52) U.S. Cl.
CPC ............... *G05B 19/4155* (2013.01); *G05B 2219/45017* (2013.01)

(56) References Cited

U.S. PATENT DOCUMENTS

| | | | | |
|---|---|---|---|---|
| 8,935,986 | B2* | 1/2015 | Blomme | A01C 5/064 |
| | | | | 111/164 |
| 9,743,578 | B2* | 8/2017 | Blomme | A01C 7/105 |
| 9,936,631 | B1* | 4/2018 | Hubner | A01C 7/205 |
| 10,219,430 | B2* | 3/2019 | Blomme | A01C 5/062 |
| 11,051,446 | B2* | 7/2021 | Antich | A01B 76/00 |
| 11,212,955 | B2* | 1/2022 | Schoeny | A01C 7/205 |
| 2007/0003107 | A1 | 1/2007 | Wei et al. | |
| 2011/0041399 | A1 | 2/2011 | Stachon et al. | |
| 2012/0042813 | A1* | 2/2012 | Liu | A01C 7/105 |
| | | | | 111/149 |
| 2012/0046838 | A1* | 2/2012 | Landphair | A01C 1/00 |
| | | | | 701/50 |
| 2013/0319698 | A1* | 12/2013 | Adams | A01C 5/064 |
| | | | | 172/4 |
| 2015/0094917 | A1* | 4/2015 | Blomme | A01C 5/062 |
| | | | | 701/50 |
| 2015/0100358 | A1 | 4/2015 | Klavins | |
| 2016/0183450 | A2* | 6/2016 | Koch | A01C 21/00 |
| | | | | 701/50 |
| 2017/0223947 | A1* | 8/2017 | Gall | G01N 21/4738 |
| 2023/0240164 | A1* | 8/2023 | Arnett | A01B 49/027 |
| | | | | 111/149 |

* cited by examiner

Distance = 14.5 cm, which = 668.1 pixels

AUTOMATIC SYSTEM FOR MEASURING SPACING, DEPTH, AND GEOLOCATION OF SEEDS

CROSS-REFERENCE TO RELATED APPLICATIONS

The present application is the U.S. National Stage of International Patent Application No. PCT/US2020/043387, filed Jul. 24, 2020, which claims the benefit of U.S. Provisional Patent Application No. 62/879,169, filed Jul. 26, 2019, each of which is incorporated by reference herein in its entirety.

BACKGROUND OF THE INVENTION

Field of the Invention

Proper seed placement during planting is critical to achieve the maximum potential yield of crop. While uniform plant spacing and seeding depth are often used by corn growers to determine the performance of precision planters, these parameters can be influenced by other factors which are not machine related such as germination percentage, diseases, and various soil properties. Currently, the ideal way to determine planter performance is to manually measure seed to seed spacing and seeding depth. However, this process is laborious, difficult, and prone to human errors. The present invention is directed toward an automated measurement system that is capable of measuring seed spacing and seeding depth and provide geo-location of all planted seeds.

Description of the Prior Art

Corn is one of the primary agricultural commodities in the U.S. which accounts for more than 27% of the total cropland harvested (USDA-ERS, 2017). Total production was 15.1 billion bushels in 2016 equivalent to average operating costs of more than $41 billion spent by corn growers (USDA-ERS, 2017). However, cash income from corn sales in 2017 is expected to be 0.7% or over $0.3 billion lower than in 2016 and has been continuously declining since 2013. In addition, it is projected that acres planted for corn will be reduced by over 9% in the next 10 years (USDA, 2017b) which also results in a projected decrease in corn production (USDA, 2017a). With high cost of production, continuous decline of corn receipts (USDA-ERS, 2017), and projected reduction in production area and yield, more growers are relying on precision agriculture technologies to cut costs, maximize land area, and improve yield to sustain farming productivity.

Planting is one of the most critical components in agricultural production, which can have a major influence on potential yield. Proper placement provides seeds the ideal environment for germination and growth. As such, uniform plant spacing and seeding depth are two of the most important parameters to be achieved during planting. These parameters preferably result in a final plant population with the desired plant density and uniform emergence. Studies have shown the influence of multiple plants, non-uniform plant spacing, delayed emergence and uneven seeding depth on grain yield. Khim Chim et al. (2014) conducted a controlled experiment to evaluate effects of varying plant spacing and plants per hill on corn yield. Results suggested higher grain yield at narrower uniform plant spacing with one plant per hill. However, wider uniform plant spacing resulted in a higher yield when the number of plants per hill is increased. Likewise, non-uniform plant spacing caused by multiple or missing plants measured by the spacing standard deviation had varying effects on the yield. Nielsen (2006) suggested significant difference on yield across the different plant spacing variability (PSV) treatments. An average of 1.7 bushels per acre yield loss is reported for every inch increase in standard deviation (SD) of plant spacing. Similar results were reported by Krall et al. (1977) where yield continuously decreased with increasing spacing variability at two different study areas. Previous studies showed that reducing the spacing standard deviation by one inch could result in an average yield increase of 3.4 bu/acre (Doerge et al., 2002) and 6.3 bu/acre when spacing standard deviation was reduced by 2 inches (Nielsen, 2001). Thus, improving planter performance by reducing plant spacing variability is important in increasing yield. Furthermore, variability in seeding depth can affect emergence. Knappenberger et al. (2014) reported that emergence of corn was significantly correlated with seeding depth where deeper seeding depth resulted in higher emergence due to availability of moisture and warmer soil temperatures which are favorable conditions for seedling emergence. Grain yield was affected when seeds emerged unevenly. Thomison et al. (2012) conducted a two-year study on effects of seeding depth on yield of corn and showed a 13% to 40% yield difference between shallow and deep planting depths. Observed yield effects for the shallow planting depths were due to reduced final plant population which might be caused by slow and uneven emergence.

While uniform plant spacing and seeding depth are often used by corn growers to determine the performance of precision planters, these parameters can be influenced by other factors, which are not machine related, such as germination percentage, diseases, and various soil properties. The ideal way to determine planter performance is to measure seed to seed spacing (Nakarmi et al., 2012) and ability to maintain a consistent actual planting depth during planting (Anonymous, 2015). However, seed spacing and depth during planting can only be measured by manually digging the soil furrow. This process is labor intensive and is prone to measurement errors. Post emergence, seed spacing can be measured through emerged plants whereas seeding depth measurement is performed by manually digging emerged plants and measuring the distance of the seed to the ground level. Each year, agronomists, service professionals, producers, and engineers manually measure seed spacing and depth on a large amount of plants to validate the accuracy of the planting systems. Simply digging a sampling of plants is not sufficient to represent whole field variation (e.g., thousands of plants). Thus, automating the process is important to improve the effectiveness and efficiency of planting systems, provide real-time feedback to the system operator, gather field-wide planting data, and reduce labor requirements and susceptibility to errors.

SUMMARY OF THE INVENTION

According to one embodiment of the present invention a seed planting assembly is provided comprising a seed planting device configured to create a furrow in the ground, deposit a seed into the furrow, and close the furrow. A camera is attached to the seed planting device and configured to capture an image of the seed in the furrow prior to closing of the furrow. A GPS unit is attached to the seed planting device and located in vertical alignment with the camera and operable to detect the geographic coordinates of the center of the image. A processor is also included that is operable to analyze consecutive images captured by the camera and stitch the images together thereby forming a stitched image comprising at least two adjacent seeds within the furrow. Embodiments of the present invention may also comprise a light section sensor positioned to be in facing relationship to the furrow and operable to detect the deepest portion of the furrow contained within the image captured by the camera and the ground adjacent to the furrow. The assembly may also comprise a potentiometer mounted on the seed planting device and configured to provide information to the processor corresponding to the vertical displacement of the seed planting device during planting operations and to calculate a unit increase or decrease in the measuring position of the light section sensor. The assembly may also comprise a light source mounted on the seed planting device and configured to illuminate the furrow and seeding during image capture by the camera.

According to another embodiment of the present invention there is provided a method of measuring planting characteristics of seeds. The method comprises creating a furrow in the ground and depositing a first seed within the furrow. A camera is used to capture a first image comprising the first seed within the furrow. A GPS unit positioned in vertical alignment with the camera is used to detect and record the geographic coordinates of the center of the first image. A second seed is deposited within the furrow. The camera is used to capture a second image comprising the second seed within the furrow. The GPS unit is used to detect and record the geographic coordinates of the center of the second image. A processor is used to stitch the first and second images together to form a stitched image, the stitched image comprising the first and second seeds. The processor is used to analyze the stitched image to determine the number of pixels between the first and second seeds and to convert the number of pixels into a basic unit of measurement using a pixel-to-distance calibration factor thereby determining the spacing between the first and second seeds. In certain embodiments of the present invention, the method may also comprise using the geographic coordinates of the centers of the first and second images to determine the geographic coordinates of the first and second seeds. The method may also comprise using a light section sensor positioned in facing relationship to the furrow to detect the deepest portion of the furrow contained within the first and second images captured by the camera and the ground adjacent to the furrow, and using the processor to calculate the difference between the deepest portion of the furrow and the ground adjacent to the furrow to determine a depth of the seed in the ground. The method may also comprise using a potentiometer mounted on a device that is creating the furrow and depositing the seeds to provide information to the processor corresponding to a vertical displacement of the seed planting device during planting operations and to calculate a unit increase or decrease in the measuring position of the light section sensor.

Embodiments of the present invention enable data to be generated that provides an automated and accurate assessment of planting operations on a field-wide scale. The data generated includes a precise count of the number of seeds planted in a particular field or area, and a number of characteristics associated with the planted seeds, including instant (or nearly instant) determination of seed spacing, seed depth, and the geolocation of each seed. This data can be provided substantially in real-time to the operator of the planting equipment so that adjustments can be made to the planting equipment as soon as an unfavorable condition is detected to ensure maintenance of optimal planting characteristics for the seeds and ground in which the seeds are placed throughout the planting operation.

In addition to the above, the data generated can be used to generate a highly accurate map of the field in which the seeds are planted, as the geolocation of every seed is known. This highly accurate map can be used to guide autonomous farming machinery performing work in the field, such as delivering fertilizer or pesticide. Knowing the geolocation of each seed permits autonomous equipment to readily differentiate weeds from the growing crops and to apply herbicides to the weeds and avoid application of herbicides to the growing crops. Also, routes taken by the autonomous equipment through the fields can be optimized by knowing the geolocation of each seed in order to avoid damage to the plants.

Figure 1:
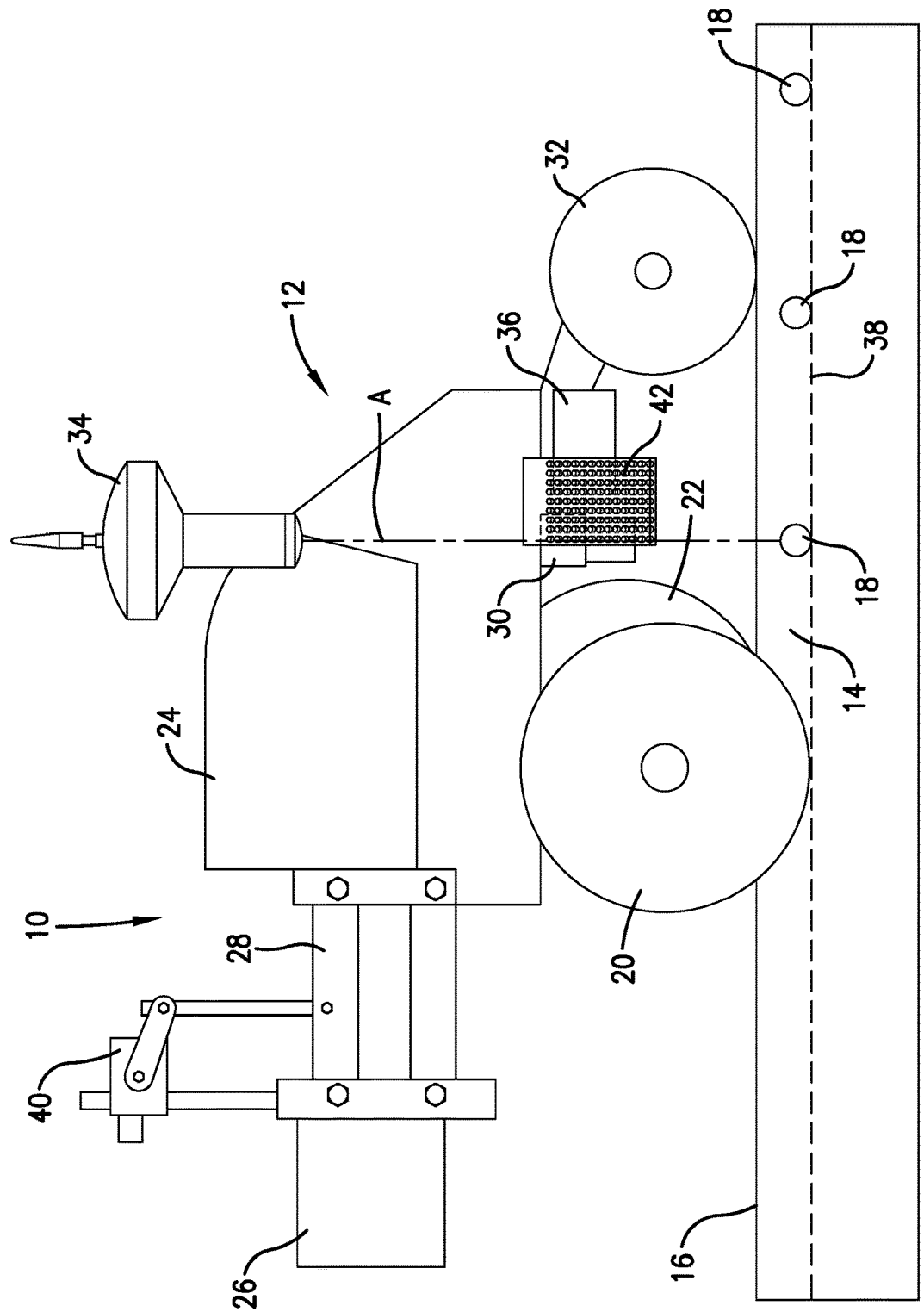
FIG. 1 schematically depicts a seed planting assembly according to an embodiment of the present invention and illustrates the alignment of the GPS unit and high-speed camera on the row unit.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

Placing seeds at the desired depth and spacing consistently and within schedule is a challenge for growers during planting season. Row crop planters have become bigger and more sophisticated. Technological advancements with row crop planters allows planting operations to be accomplished more precisely and faster than ever before thereby providing growers the opportunity to maximize yield over a wide range of operating conditions. As the width of the planter toolbar increases, so does the variability on seed placement across all row units. Understanding how planting technologies respond to field heterogeneity will provide growers the decision tools to maximize planter performance based on planting requirements of their field.

Downforce technology in row crop planters has progressed from mechanical springs to hydraulic cylinders aiming to accurately manage weight acting on individual row units. Ideal downforce prevents soil compaction and ability to place seeds at the right depth with the right soil moisture and temperature providing the ideal seed-to-soil contact leading to proper seed germination and plant development. Field conditions can vary between plots of land and have been shown to cause variability in real-time gauge wheel load (GWL) of individual row units which could potentially affect planting performance. Soil strength and moisture can be indicated by soil texture which can be defined as the ability of the soil to hold water. Coarse-textured or sandy soils have a lower capacity to hold moisture and requires lower resistance for soil penetration. On the other hand, fine-textured or clay soils have higher water holding capacity and higher penetration resistance. Planting on soil with varying soil texture requires different levels of downforce to overcome soil resistance in creating the seed furrow. Actual planting operations revealed that fixed downforce setting resulted in significant areas where the row unit applied too much or less than 0 GWL. Too much GWL could cause the seeds to be planted too deep or create furrow sidewall compaction restricting seed emergence and affecting plant development. Less than 0 GWL suggests uncertain seeding depth due to potential loss of contact between the gauge wheels and the ground surface. Understanding gauge wheel variability and its impact on planter operation is critical for both selecting the type and resolution of downforce control systems for planters.

Most manufacturers started by manufacturing pneumatic downforce control systems with section control. However, more recently most manufacturers have moved to adopting hydraulic downforce control on a row-by-row basis. There is a verifiable need to vary levels of downforce across a range of machine and field operating conditions. Selecting the ideal downforce at planting is important at it defines how plants will develop throughout the whole growing season. Selection of incorrect downforce can impact the accurate seeding depth without the operator knowing it from the cab display, although the monitor would indicate correct management of user selected target downforce.

Seeding placement and machine dynamics during planting could impact yield variation, and possibly produce significant row-to-row yield variations. One or more embodiments of the present invention may provide direct information on the most critical seed placement parameters. A seeding depth sensing system could provide direct feedback to the user and to fine tune machine control to correctly place seed. Certain embodiments of the present invention can provide operators feedback on real-time spacing and depth allowing downforce adjustments according to actual soil conditions.

One or more embodiments of the present invention utilize computer vision and image-based technologies to automate information gathering associated with seed spacing and depth. Such information gathering also identifies the precise coordinates of each seed through the use of GPS systems. Image mosaicking is used to combine overlapping images using common reference points within the images and create a single image with a wider field of view. Creating a mosaicked image can be done using direct or feature based algorithms (Gosh, et al, 2016, Jain et al, 2013 and Fathima et al, 2013). Direct methods work by finding a consistent set of correspondence and calculating correlations between features in the image using all pixels and usually are performed using a correlation matrix (Renuka, 2016). This method is useful when mosaicking images with large regions of overlaps including small translations and rotations (Renuka 2016, Prados, et al, 2014, Jain et al, 2013), but it requires complex calculation (Fathima et al, 2013). Feature based methods identify distinct low-level features such as edges, corners, or pixels between the two images (Gosh, et al, 2016) and match them together to form a global correspondence (Fathima et al, 2013). This process reduces the computational complexity (Renuka, 2016) and usually handle images with small regions of overlap (Renuka, 2016 and Jain et al, 2013), and detection of common features is possible even at changing geometric viewpoints (Gosh, et al, 2016).

Automating the process of measuring seed spacing, depth, and geolocation provides significant information on the location of the seeds in the furrow, which can be used to improve planter performance and implement optimal planter settings. Thus, the present invention generally provides a system to measure real-time seeding depth, seed spacing, and seed localization during planting. Specifically, embodiments of the present invention aim to accomplish at least one of the following: (1) stitch captured real-time images of individual seeds planted, (2) measure seed spacing using the stitched image, (3) record actual seeding depth during planting, and (4) provide GPS coordinates of individual images.

In certain embodiments of the present invention, the measurement of seed placement uses a high-speed camera, a light section sensor, and a GPS unit. FIG. 1 illustrates an embodiment of a seed planting assembly 10. Assembly 10, as depicted, comprises a seed planting device 12, namely a planter row unit, a plurality of which can be attached to a common framework to form a multirow planter capable of simultaneously planting any desired number of rows. The seed planting device 12 is configured to create a furrow 14 in the ground 16, deposit a seed 18 into the furrow, and close the furrow. The furrow 14 is created by one or more openers 20, such as opening discs. The planter row unit 12 may also comprise one or more gauge wheels 22 that are operable to control the depth of the furrow 14 created by the one or more seed openers 20. Seeds 18 are initially held in seed bin 24 and metered therefrom to be deposited in the furrow 14, using, for example, a seed tube (not illustrated). The unit 12 is connected to the implement header 26 via linkage arms 28.

The unit 12 comprises a camera 30 that is configured to capture an image of each seed 18 in the furrow 14 before the furrow can be closed by closing wheels 32. The camera 30 is mounted in a downward configuration so that the camera lens faces the furrow 14 where seeds 18 are approximated to drop from a seed tube of the planter. The unit 12 further comprises a GPS unit 34 that is located in vertical alignment with the camera 30, and particularly the camera lens, as indicated by axis A. The GPS unit 34 is operable to detect the geographic coordinates of the center of an image of the seed 18 within furrow 14. The assembly 10 further includes a processor that is operable to analyze consecutive images captured by camera 30 and to stitch the images together thereby forming a stitched image (see, e.g., FIG. 5) comprising at least two adjacent seeds 18 within the furrow 14.

In one or more embodiments, camera 30 is positioned on planter row unit 12 in between the one or more gauge wheels 22 and the one or more closing wheels 32, although this need not always be the case and may depend upon the configuration of the planter row unit. In one or more embodiments, the GPS unit 34 is mounted on the planter row unit 12 directly over the camera 30 so that it is capable of receiving GPS radio signals without obstruction from assembly 10.

In one or more embodiments, the assembly 10 further comprises a light section sensor 36 positioned to be in facing relationship to the furrow 14 and operable to detect the deepest portion of the furrow 14 contained within the image captured by the camera 30 and the ground 16 adjacent to the furrow 14. In one or more embodiments, the light section sensor 36 is operable to calculate the difference between the deepest portion 38 of the furrow 14 and the ground 16 adjacent to the furrow 14. This difference corresponds to a depth of the seed 18 in the ground 16.

In one or more embodiments, the seed planting assembly 10 further comprises a potentiometer 40 mounted thereon that is configured to provide information to the processor corresponding to vertical displacement of the seed planting device 12 during planting operations and to calculate a unit increase or decrease in the measuring position of the light section sensor 36. In one or more embodiments, assembly 10 further comprises a light source 42 mounted on the seed planting device 12 that is configured to illuminate the furrow 14 and seeds 18 during image capture by the camera 30. In certain embodiments, the light source 42 comprises one or more LEDs.

In one or more embodiments, assembly 10 can be used to measure the planting characteristics of seeds 18. In such methods, furrow 14 is created in the ground 16 and a first seed 18 is deposited within the furrow. Camera 30 is used to capture a first image that comprises the first seed 18 within the furrow 18. GPS unit 34, which is positioned in vertical alignment with the cameral 30, detects and records the geographic coordinates of the center of the first image. Next, as the assembly 10 progresses forward in the field, a second seed 18 is deposited within the furrow 14. Camera 30 is used to capture a second image that comprises the second seed 18 within the furrow 14. The GPS unit 34 detects and records the geographic coordinates of the center of the second image. The processor is used to stitch the first and second images together to formed a stitched image that comprises the first and second seeds 18. The stitched image is then analyzed, using, for example, the processor, to determine the number of pixels between the first and second seeds 18 and to convert the number of pixels into a basic unit of measurement using a pixel-to-distance calibration factor thereby determining the spacing between the first and second seeds 18.

In one or more embodiments, the method comprises using the geographic coordinates of the centers of the first and second images to determine the geographic coordinates of the first and second seeds 18. Also, in one or more embodiments, light section sensor 36, which is positioned in facing relationship to the furrow 14, is used to detect the deepest portion 38 of the furrow 14 contained within the first and second images captured by the camera 30 and the ground 16 adjacent the furrow to determine a depth of the seed 18 in the ground.

The potentiometer 40, which is mounted on device 12 that is creating furrow 14 and depositing seeds 18, can be used to provide information to the processor corresponding to a vertical displacement of the seed planting device 12 during planting operations and to calculate a unit increase or decrease in the measuring position of the light section sensor 36.

The system is programmed to capture images and collect GPS coordinates simultaneously at equal sampling frequency. For example, digital camera 30 can be capable of capturing 700 fps. However, capturing all of these images would generate needless volumes of information as only one image containing each seed is necessary. Therefore, advantageously, the camera 30 can be programmed to capture images based upon the forward velocity of the planting device 12 during planting operations. It is common for planting equipment to be used at a forward velocity of between 3 to 10 mph, with 6 mph being particularly preferred. In that range of forward velocity, the camera 30 can be operated to capture between 10 to 20 fps. Preferably, each image captured by the camera 30 will contain an image of at least one seed 18. In a certain minority of images, two seeds will be captured in the image. However, this does not present a problem as the image can be stitched with immediately preceding or following images and the planting characteristics of both seeds can be analyzed.

Figure 7A:
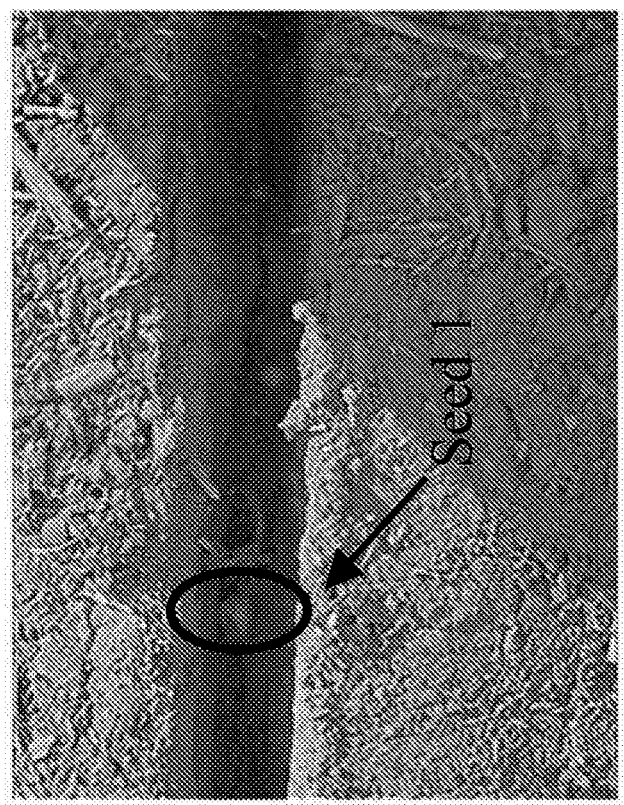
FIGS. 7A and 7B depict another two consecutive photographs to be stitched together for seed spacing measurement.
Figure 7B:
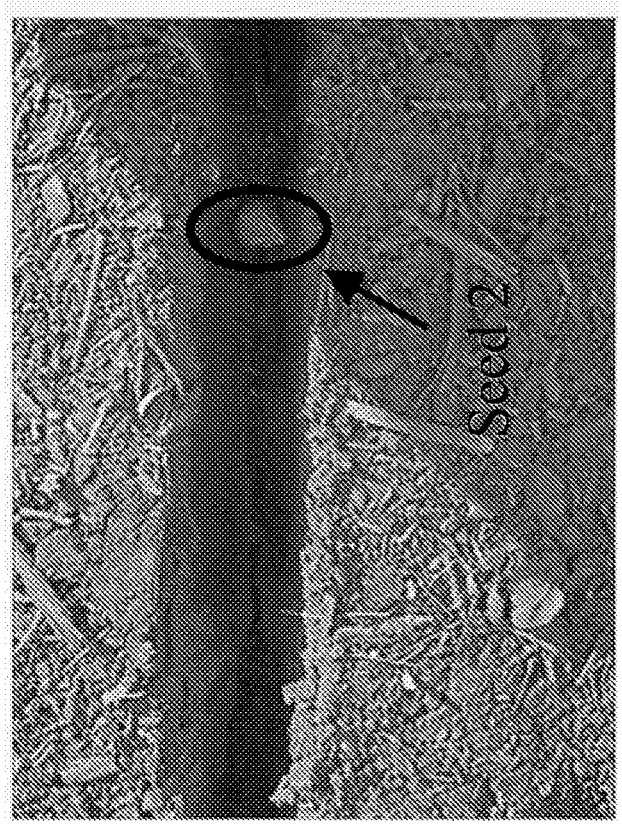
Figure 7C:
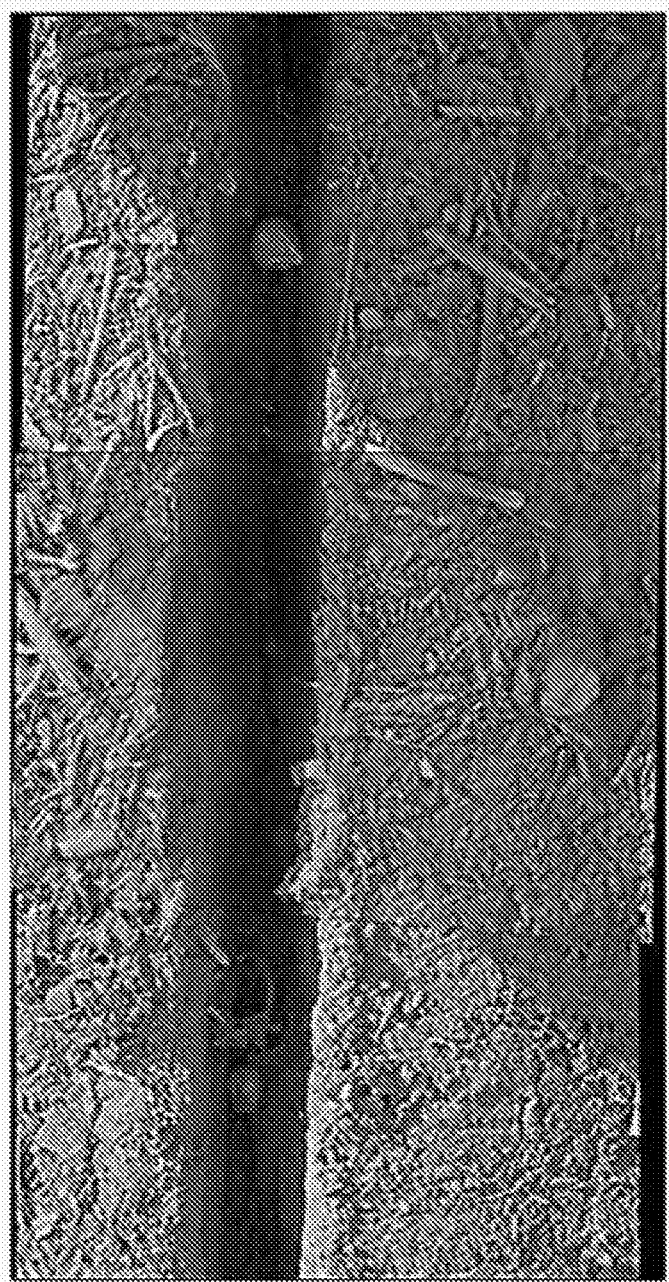
FIG. 7C is the stitched image of FIGS. 7A and 7B.
Figure 9:
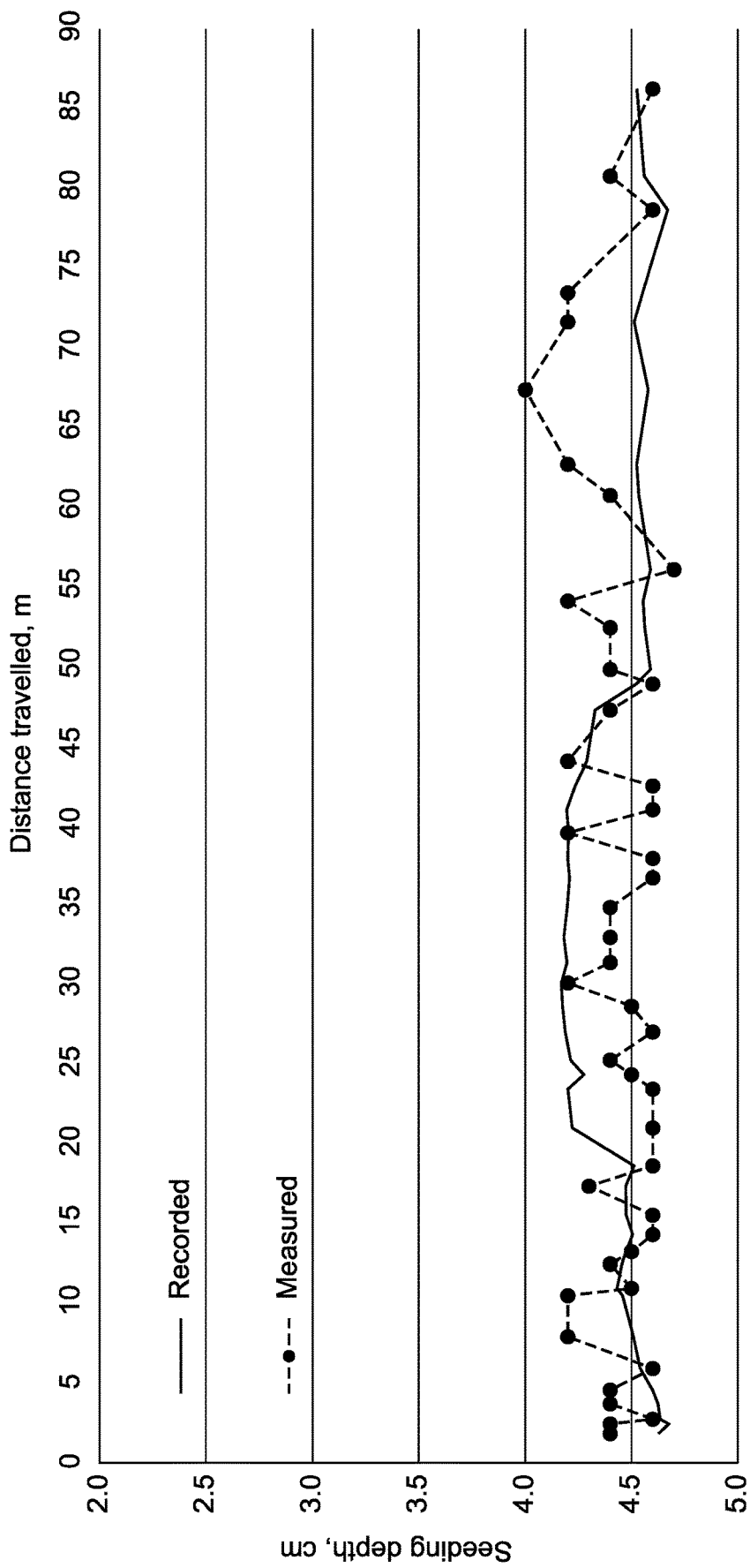
FIG. 9 is a chart of the seeding depth during planting based upon sensor measurements (recorded) and actual measured depths (measured)
Figure 10A:
FIG. 10A depicts a sample image.
Figure 10B:
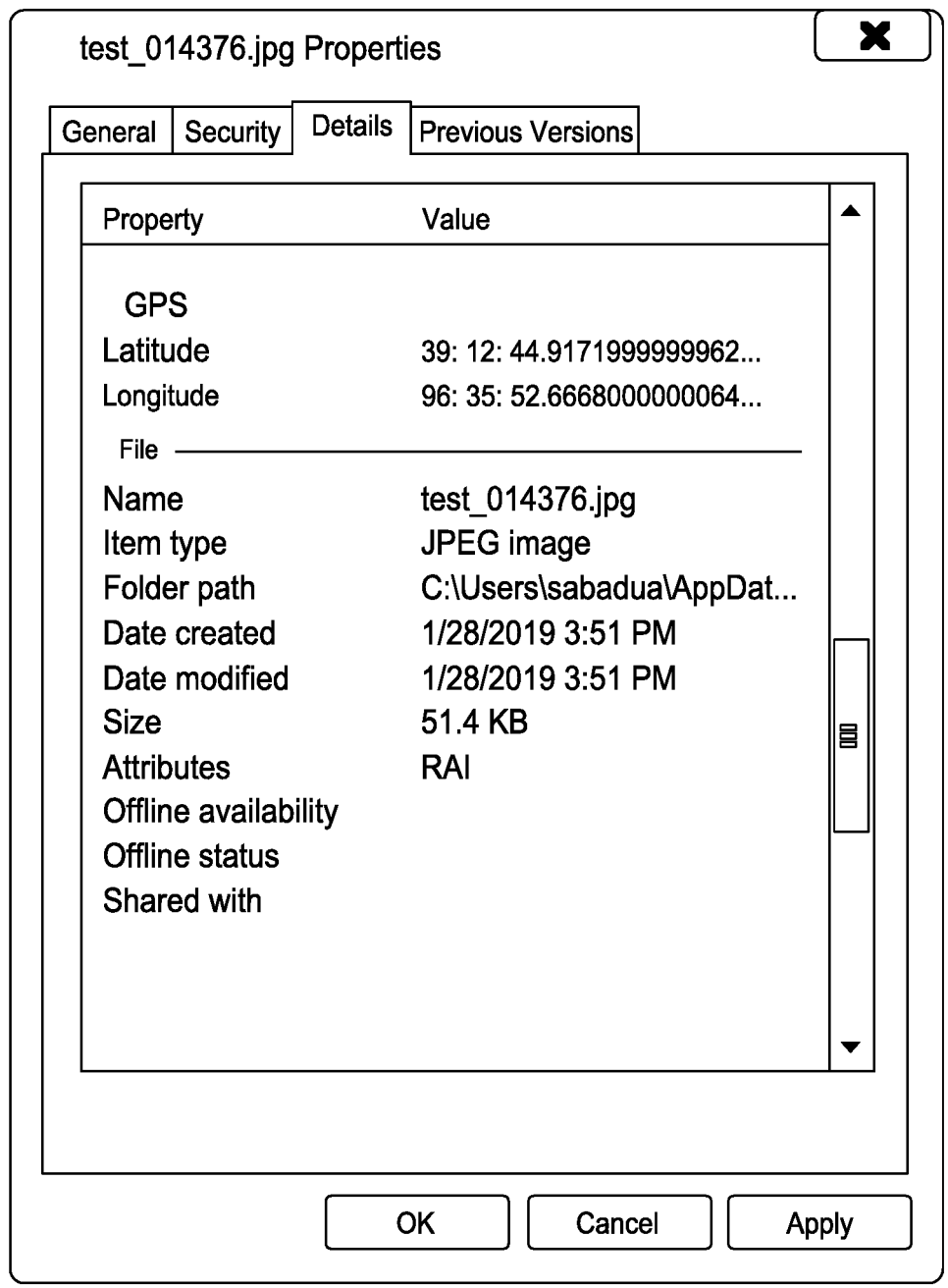
FIG. 10B depicts the GPS coordinates of the seed in FIG. 10A.

The following description is directed toward an exemplary apparatus which several principles of the present invention were tested. A cultivation test apparatus comprising rails upon which the specially configured planter is mounted was used. To measure seed spacing, the SAM system captures images as seeds drop into the furrow. Preferably, nearly every image contains one seed, and the SAM system stiches two consecutive images with one seed in each image (see, FIGS. 4 and 7A and 7B) to create a stitched/single image which contains two seeds (see, FIGS. 5 and 7C). The system utilizes this image to perform a spatial calibration where it converts pixels into real world units. After calibration, the system repeats the same process using two different successive images, and then uses the calibration value to measure the seed spacing from the generated stitched image. To measure seeding depth, the light section sensor, which is mounted along the camera also facing the furrow, calculates the difference between the lowest part of the furrow and the ground. This difference is the seeding depth or depth of the furrow. FIG. 9 shows actual seeding depth compared to recorded or measured seeding depth using the system. FIG. 10B shows the GPS coordinate of one image (FIG. 10A) provided by the GPS unit.

Seed Spacing Measurement

In one embodiment of the present invention, the process of calculating the seed spacing comprises the following steps:

(1) Image acquisition
(2) Image stitching
(3) Spatial calibration
(4) Calculation of seed spacing Image Acquisition Exemplary apparatus for image capture that was assembled and tested included a high-speed camera (acA640-750uc, Basler AG, Ahrensburg, Germany) configured using the NI Measurement and Automation Explorer (MAX) installed in LabVIEW (National Instrument, Austin, TX, USA). The camera was connected to a control laptop computer (Latitude 14 3470, Dell, Round Rock, TX, USA) with a 2.5 GHz Intel Core i7-6500U CPU (Intel, Santa Clara, CA, USA) and 8 GB installed memory (RAM)) through the USB 3.0 interface. The camera exposure time was set at 488 microseconds (µs) to prevent capturing blurred objects or features on the images. Since the amount of light is proportional to the exposure time, an LED strip tape (4NFLS-x2160-24V, SBL, St. Louis, MO, USA) was used to provide additional lighting to illuminate features or objects of interest on the ground. The camera was mounted in between the gauge wheels and the closing wheels at a vertical distance of 8 inches from the camera lens to the ground level. The camera was fitted with a 5 Megapixel C-Mount fixed focal lens (C125-0418-5M, Basler AG, Ahrensburg, Germany) which provided a field of view (FOV) corresponding to an image size of 15.7 cm by 11.7 cm. The camera was oriented such that the lens faced the furrow where seeds are assumed to drop from the seed tube and aligned vertically with the sub-inch accuracy, real-time kinematic (RTK) GPS unit (GR5, Topcon Positioning Systems, Inc., Livermore, CA, USA) mounted on top of the row unit. See, FIG. 1.

To ensure the camera captured more than 50% overlap on the images for effective image stitching, the high-speed camera was configured to transmit and record at 10 fps at a bit rate of 92 MB/s over a USD 3.0 interface using the Pylon Viewer (Basler AG, Ahrensburg, Germany). Image resolution was about 0.3 Megapixel with pixel dimension of 656×496 pixels. Likewise, the Horsch Terminal ME controller (Horsch LLC, Mapleton, North Dakota) was programmed to plant corn at 103,200 seeds/hectare seeding rate that corresponds to a seed spacing of 12.7 cm. The row unit was mounted on the customized cultivation assessment test apparatus (CAT App), which comprised a row unit toolbar that can be raised/lowered and moved back/forth along the 12.2-m long rails by a 31 HP gasoline engine (Vanguard, Briggs and Stratton, Wauwatosa, WI). A four-wheel tractor (LA1251, Kubota, Grapevine, TX) was used to pull and move the CAT App within the field during testing.

A separate program controls the speed of the engine which was programmed to run the set up at a target speed of 6.4 kph for all the tests. During testing, the closing wheels of the row unit were raised to prevent it from closing the furrows. This enabled the manual measurement of seed spacing that was used for comparing the actual and calculated seed spacing using the root mean square error (RMSE) equation. This is a measure of how close the calculated spacing is to the actual spacing and is represented by as equation 1.

$$RMSE = \sqrt{\frac{\sum_{i=1}^{n}(\hat{y}_i - y_i)^2}{2}} \quad (1)$$

Image Stitching

Figure 2:
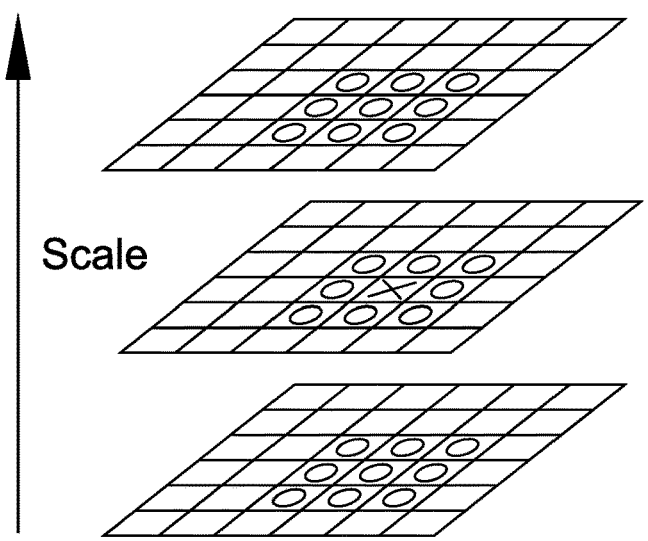
FIG. 2 is a schematic depiction of keypoint detection in a stack of DoG images.

A feature-based matching algorithm was used to combine captured images to create a panoramic image for seed spacing measurement. The scale invariant feature transform (SIFT) algorithm is an effective tool to extract common feature points and perform matching between two images with significant overlap and invariant to noise, occlusion and illumination changes. The matching algorithm developed in MATLAB (R2017a, Natick, MA, USA) was used to find corresponding points between the reference image and the image to be matched. There are five steps on how the algorithm is implemented as outlined by Ghosh and Kaabouch (2016) and Lowe (2004). These are scale-space construction, scale space extrema detection, keypoint localization, orientation assignment and keypoint descriptors. The first step involves the construction of scale space by generating several octaves or blurred images from the input image by applying a Gaussian filter or Gaussian blur operator to reduce noise and image details. Mathematically, this can be expressed by equation 2 as defined by Lowe (2004).

$$L(x,y,\sigma)=G(x,y,\sigma)*I(x,y) \quad (2)$$

where $L(x, y, \sigma)$ is the blurred image, * is the convolution operator, $G(x, y, \sigma)$ is the Gaussian blur operator and $I(x, y)$ is the input image. Next step was detecting key feature points in the scale space using a difference-of-Gaussian (DoG) operation by calculating the difference of two adjoining blurred images, L, using equation 3 as defined by Lowe (2004).

$$D(x,y,\sigma)=G(x,y,k\sigma)-L(x,y) \quad (3)$$

where k is a constant multiplicative factor. Keypoint candidates in a stack of DoG images are detected by comparing a pixel to its neighboring pixels at the current and adjacent scales. See, FIG. 2. This process generated low contrast keypoints or extrema located on an edge which are then eliminated to improve matching efficiency of the algorithm.

Assigning an orientation for the keypoint is done to provide rotation invariance. This process was done by assigning the dominant orientation to the keypoint based on gradient directions and magnitude around it. The orientation, $\theta(x, y)$, for each image, $L(x,y)$, is calculated using equation 4 defined by Lowe (2004).

$$\theta(x,y)=\arctan((L(x,y+1)-L(x,y-1))/(L(x+1,y)-L(x-1,y))) \quad (4)$$

This procedure resulted in an orientation histogram where dominant local gradient orientations were identified and used to create a keypoint with that orientation. The last step is computing a descriptor or a fingerprint of the keypoint to differentiate it from other keypoints generated.

Recognizing distinct features or objects in an image is performed by first matching each feature or keypoint independently to the database of keypoints extracted from a reference image. However, many of these initial matches can be incorrect due to some outliers or indistinguishable features that arise from background noise in the image. Thus, a random sample consensus (RANSAC) algorithm was used to remove false matches or outliers and created a transformation or homography matrices that was used to stitch two overlapping images producing a stitched image.

Spatial Calibration

Figure 3:
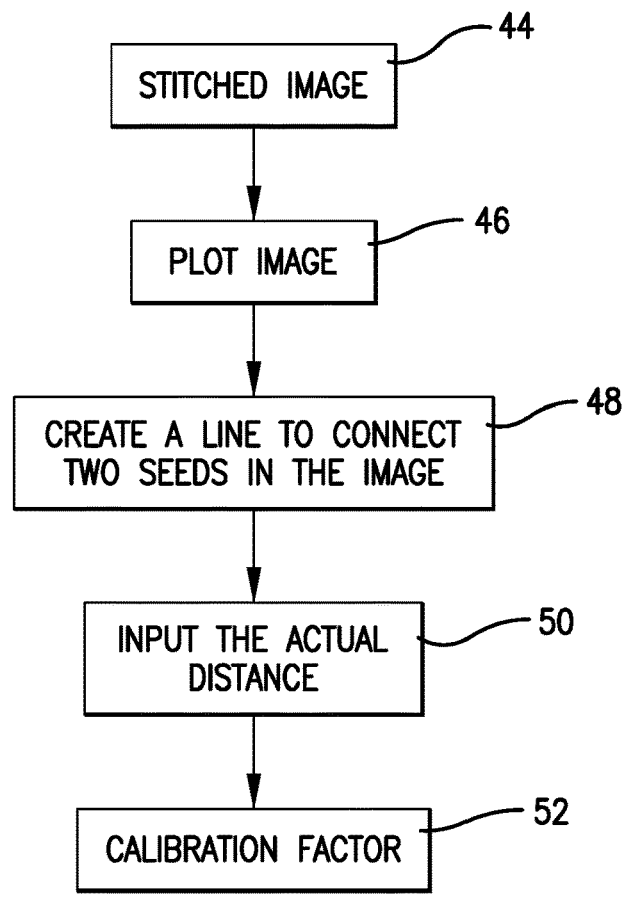
FIG. 3 is a diagram of the framework of the spatial calibration algorithm.

After generating the stitched image, a process called simple spatial calibration was performed to determine the relation of image pixels to real-world units. The spatial calibration process is illustrated in FIG. 3. The first step 44 in this process comprises forming the stitched image as described above. The image is then plotted 46 and a line created 48 that connects the two seeds in the image. By using an imagery with two seeds of known spacing or distance 50, this distance in pixels was calculated by a spatial calibration algorithm developed in MATLAB using the Euclidean distance formula as shown in equation 5.

$$d=\sqrt{(x_2-x_1)^2+(y_2-y_1)^2} \quad (5)$$

where d is the number of pixels between the two objects in the image, $(x_1, y_1)$ is the coordinate of the first object and $(x_2, y_2)$ is the coordinate of the second object. The derived conversion factor 52 from the spatial calibration was then added in the seed spacing algorithm that was used in the calculation of the seed spacing.

Calculate Seed Spacing

Once spatial calibration was done, two succeeding images were stitched, and the seed spacing was measured using the seed spacing algorithm. The algorithm calculates the spacing in pixels then multiplied to the calibration factor. This process was done independently for each stitched image.

Seeding Depth Measurement

A light section sensor (OH7-Z0150.HI0720.VI short, Baumer Electric AG, Frauenfeld, Switzerland) was used to record the seeding depth. The sensor was designed to measure the height difference between the lowest and highest point on the ground using a laser. It was attached to the 3D printed frame that was placed between the gauge wheels and the closing wheels along the center of the furrow.

A potentiometer (model 424A11A090B, Elobau sensor technology, Inc., Waukegan, Il, USA) with a linear response of 4 to 20 mA and 12 mA as the center position was mounted on the row unit to provide information on row unit vertical movement or measuring position displacement. A laboratory set up was constructed to develop a relationship curve between the light section sensor and the potentiometer by recording varying depth measurements at changing potentiometer positions using 12 mA as the reference position. This data was plotted in SAS University edition to generate a calibration equation where seeding depth was the response variable and the measuring position as the predictor variable. The slope represents the amount of change for every unit increase or decrease in the measuring position. During in-field test experiments, the recorded position was subtracted from the reference position and then the difference multiplied by the slope of the line to get the change in seeding depth due to the position displacement. The actual depth was then calculated by subtracting the calculated depth from the change in seeding depth.

Measurement System Set Up

The developed system used in the described experiments to measure seed spacing, depth and geo-location of corn seed comprises a high-speed camera, light section sensor, LED light strip, potentiometer, GPS, data acquisition system and a control computer. The system comprises two separate LabVIEW programs collecting data at 10 Hz: (1) a program to record seeding depth and location which outputs data in a .txt file, and (2) the imaging program which outputs data in a .jpg file. As the system is initiated, the high-speed camera captures images, the light section sensor records seeding depth, and the GPS unit acquires geo-locations simultaneously, all of which is saved onto an external hard drive (Transcend, Orange, CA). Thus, each image comprises data on seeding depth and geo-location.

Seed Spacing

Figures 4A, 4B:
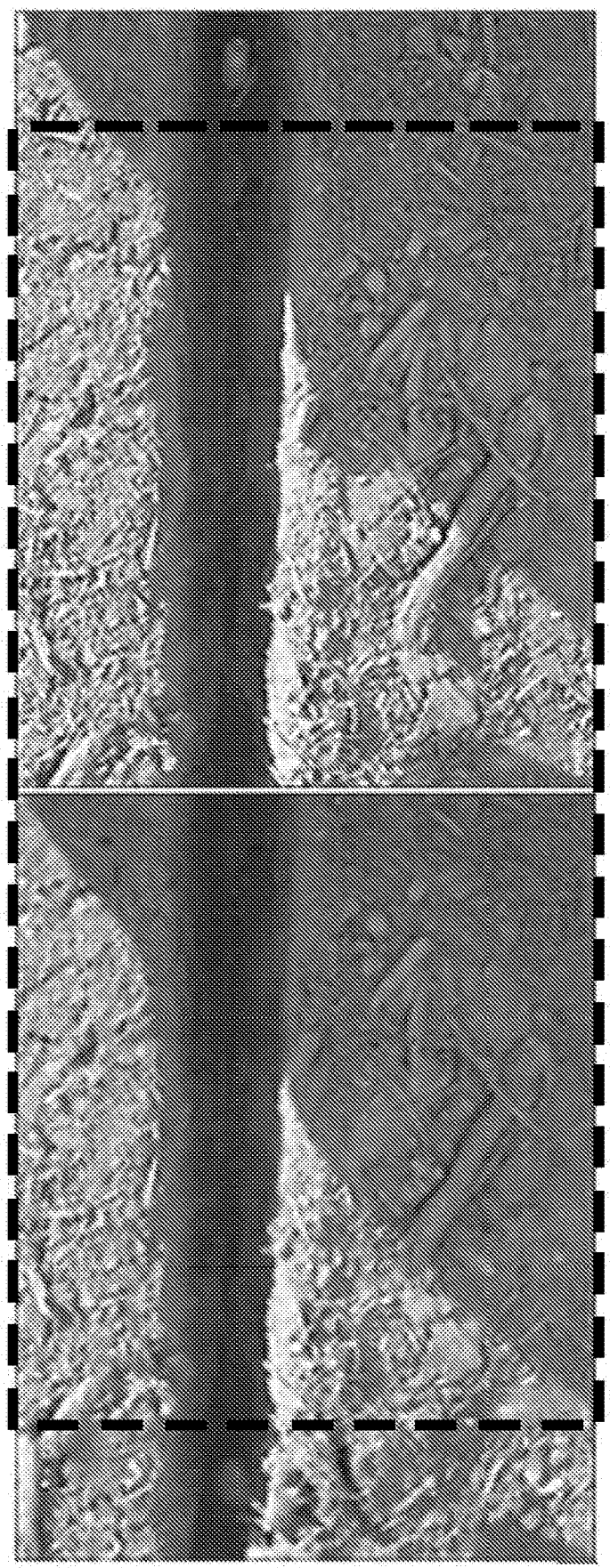
FIGS. 4A and 4B depict two consecutive photographs of (a) the reference image, and (b) the target image with the overlap between the two illustrated by the dashed-window.

The test location was a no-till field with a volumetric water content during testing ranging from 18% to 20.8%, averaging 19.1%. After each test run, actual seed spacing was manually measured by laying a measuring tape along the row beside the furrow. This data was later used to calculate the error in the seed spacing measured using the system. Samples of two successive images with overlap used in spatial calibration are shown in FIGS. 4A and 4B. FIG. 4A is the reference image, and FIG. 4B is the target image. The overlap between the two images is shown by the dashed line.

Figure 5:
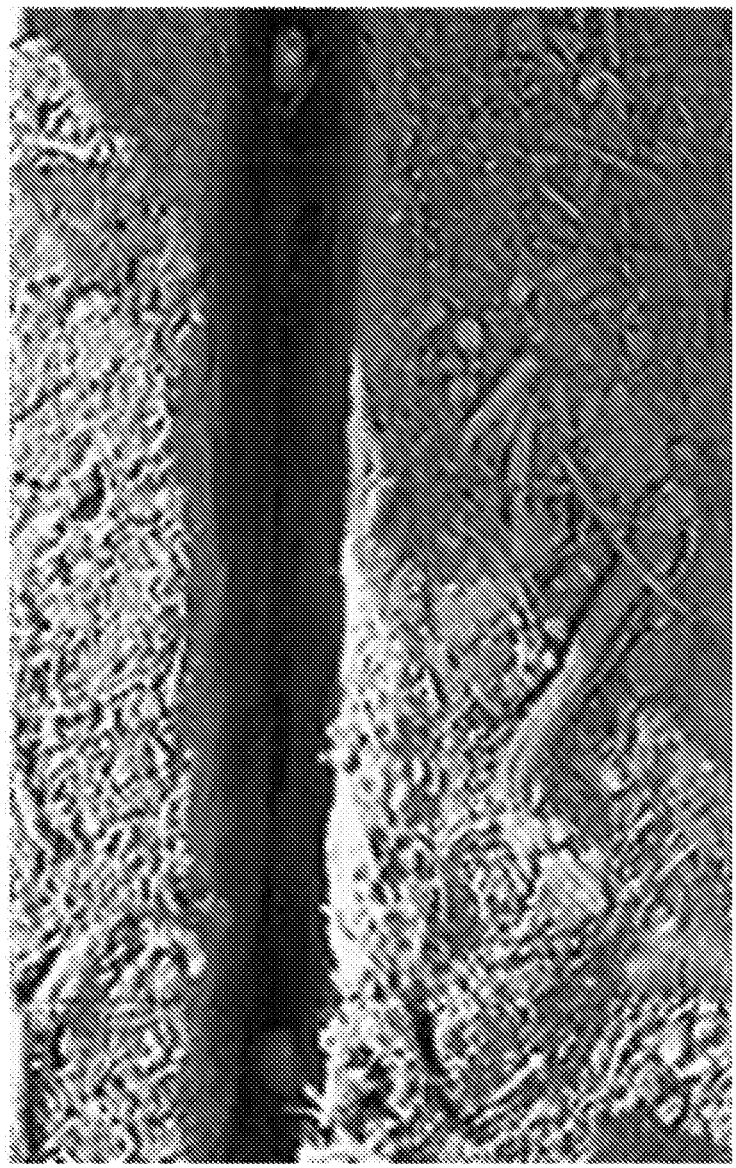
FIG. 5 is the generated stitched image using the photographs of FIGS. 4A and 4B.
Figure 6A:
FIG. 6A is a photograph of the known seed spacing taken manually.
Figure 6B:
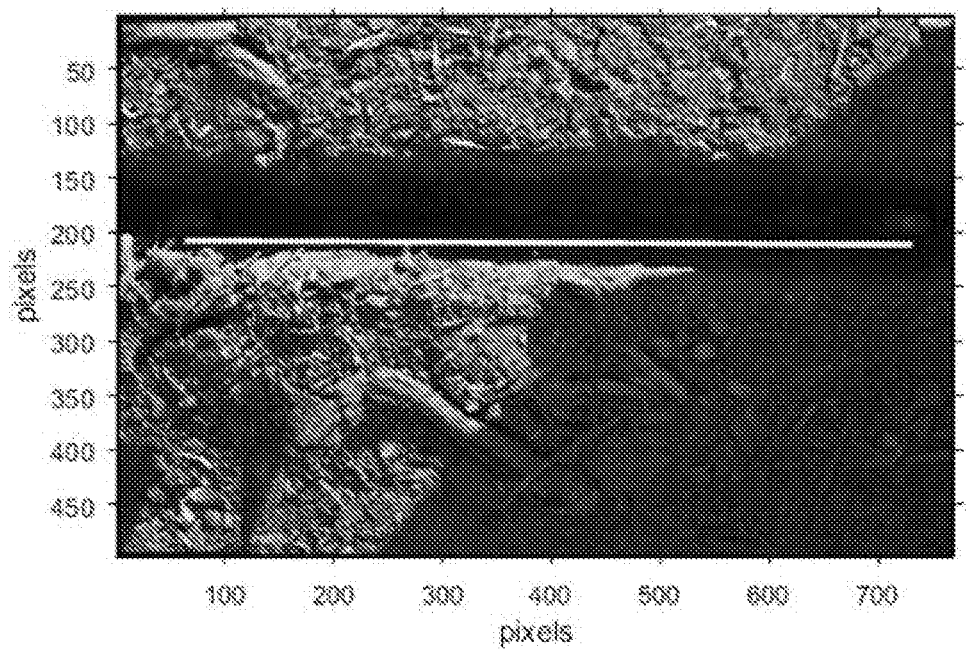
FIG. 6B illustrates the special calibration of the stitched image and the calibration value.

The image stitching algorithm used this overlap as the matching window to extract common features to determine the correspondence between the two images before combining them into one single or stitched image (FIG. 5). After generating the stitched image, the spatial calibration was performed resulting in a pixel-to-actual distance calibration factor converting a pixel into basic unit of measurement. This procedure resulted in a calibration factor of 0.022 cm per pixel. See, FIGS. 6A and 6B.

Figure 8A:
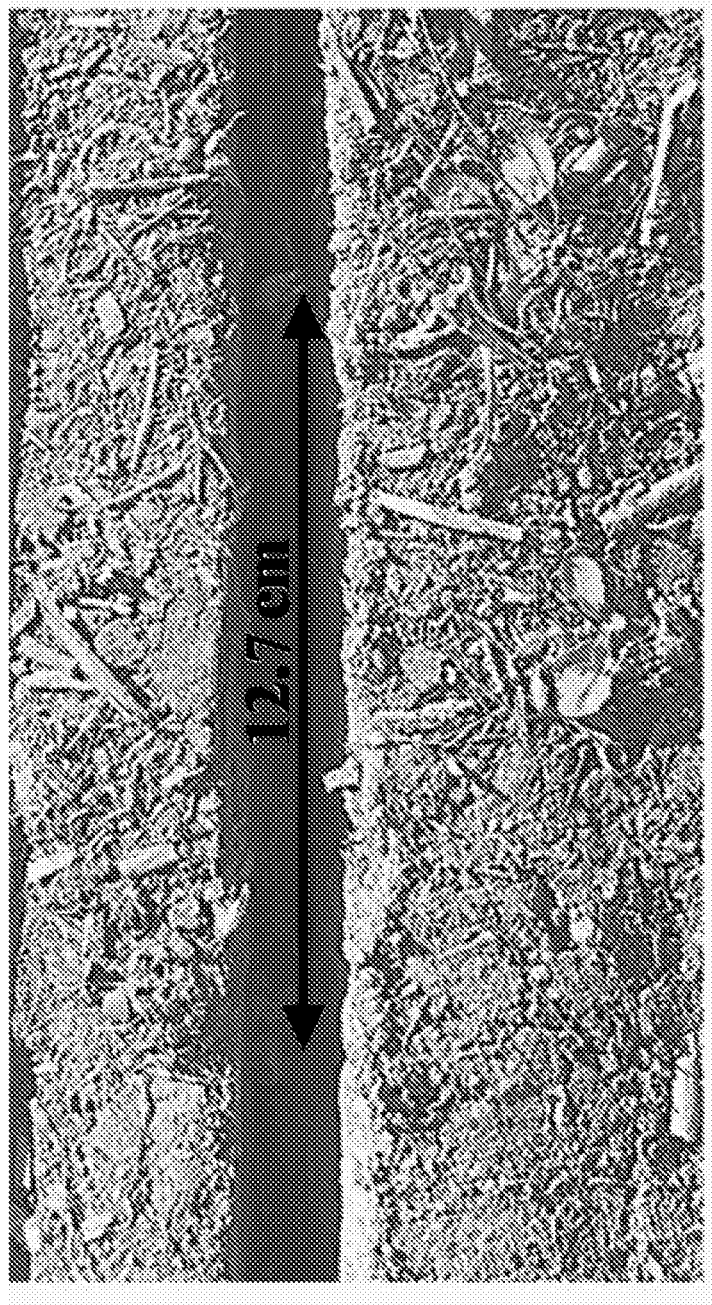
FIG. 8A is a photograph of the known seed spacing taken manually.
Figure 8B:
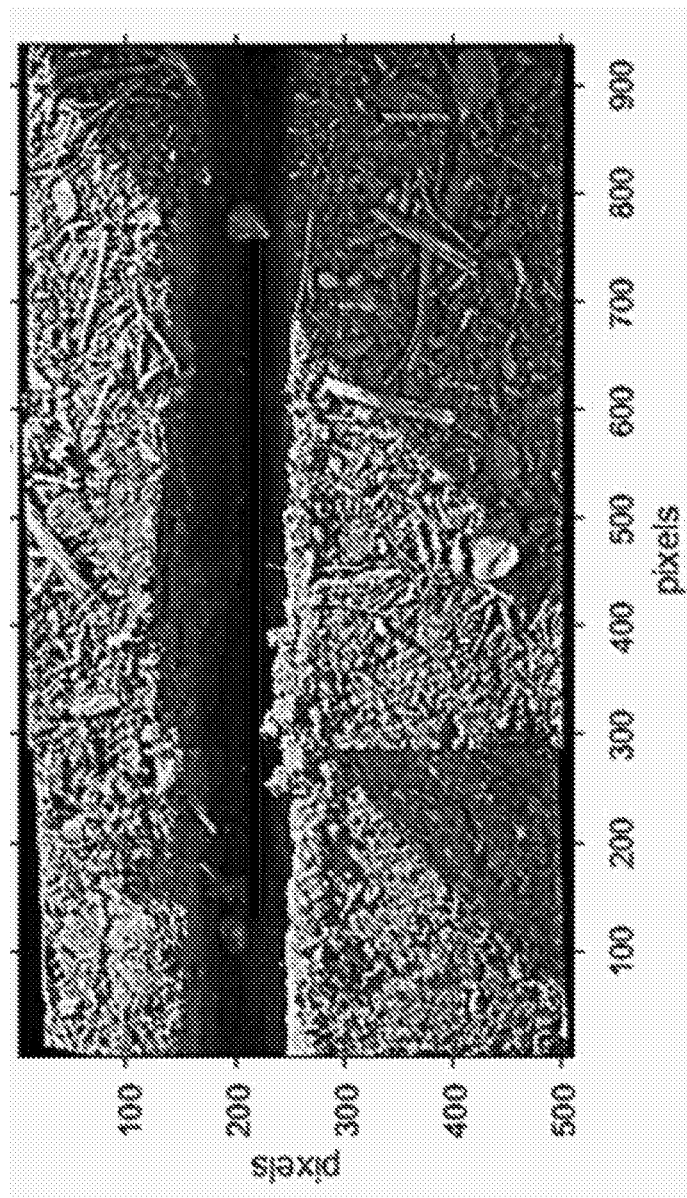
FIG. 8B illustrates measured seed spacing using the stitched image.

Another set of two successive images was stitched (see, FIGS. 7A, 7B, and 7C) to calculate the seed spacing (FIGS. 8A and 8B).

The results of the field tests showed the seed spacing measured using the system and manual measurements are presented in Table 1. The root mean square error (RMSE) was used to measure the system accuracy and the estimated or calculated spacing were regressed to actual spacing measurements to determine the models' coefficient of determination ($R^2$). Overall, the system was able to achieve an RMSE of 0.63 cm and an $R^2$ of 0.87. Measurement errors shown by the residuals can be caused by several factors which consists of distortion of acquired images caused by the camera lens and potential human errors during manual measurement of actual seed spacing.

TABLE 1

Seed spacing test results (RMSE = 0.63 and $R^2$ = 0.87).

| Actual seed spacing, cm | Distance, pixel | Conversion factor, cm/pixel | Calculated seed spacing, cm | Residual, cm |
|---|---|---|---|---|
| 12.7 | 425 | 0.028 | 12.0 | 0.7 |
| 11.9 | 410 | 0.028 | 11.5 | 0.4 |
| 14.5 | 490 | 0.028 | 13.7 | 0.8 |
| 10.7 | 370 | 0.028 | 10.4 | 0.3 |
| 12.7 | 425 | 0.028 | 11.9 | 0.8 |
| 11.7 | 410 | 0.028 | 11.5 | 0.2 |
| 10.9 | 420 | 0.028 | 11.8 | −0.9 |
| 11.4 | 420 | 0.028 | 11.8 | −0.4 |
| 14.7 | 480 | 0.028 | 13.4 | 1.3 |
| 13.2 | 460 | 0.028 | 12.9 | 0.3 |
| 13.2 | 490 | 0.028 | 13.7 | −0.5 |
| 10.4 | 350 | 0.028 | 9.8 | 0.6 |
| 12.4 | 450 | 0.028 | 12.6 | −0.2 |
| 8.9 | 325 | 0.028 | 9.1 | −0.2 |

Seeding Depth

FIG. 9 shows the recorded and measured seeding depths during the experiment. Recorded seeding depth are sensor measurements while measured seeding depths are actual seeding depths taken during the experiment. Overall, recorded seeding depths were within the tolerance of +/−6.5 mm from measured seeding depth which suggests the system has the capability of measuring real-time seeding depths accurately. This tolerance is lower than the capability required to monitor real-time seeding and will allow operators to adjust gauge wheel load levels accordingly. This will prevent over and under application of load during planting which could potentially reduce areas of shallow seeding depth or sidewall compaction.

Image GPS Coordinates

FIG. 10 shows an image of a seed deposited in a furrow and the corresponding GPS coordinate for the seed. This coordinate can be used, for example, for analysis of missing plants. In certain embodiments, the system may utilize this information to automatically geotag each image. In certain embodiments, one seed may be shown in multiple images due to the programmed degree of overlap. However, since the target distance between seeds can be very narrow, sometimes one GPS coordinate is the same for two images. Therefore, visual inspection of individual images may be performed to locate similar seeds to allow accurate assignment of GPS coordinate for seed localization. To illustrate, refer to FIGS. 7A-7C where two seeds can be seen. The images of FIGS. 7B and 7C have the same GPS coordinates which can be used to locate seed 2. On the other hand, for an image a where two seeds are present, the GPS coordinate of that image can be used to locate seed 1 since seed 2 was already assigned with its own GPS coordinate.

The ability to locate seeds provides the ability to gather information on the cause of wide gaps after seed emergence. GPS locations of areas with wide gaps can be collected and matched to the recorded GPS coordinates, which can be used to confirm placement of seed. The presence of a seed in between plants indicate proper seed metering of the planter and non-emergence can be due to seed germination issues or some other factors. For example, in areas where plants did not emerge evenly, finding the GPS coordinate of gaps between emerged plants then matching it to the collected coordinates of images with the planted seeds allows the growers to determine if there was a seed planted or if the seed did not emerge. The results can provide data on planter metering performance or germination issues.

CONCLUSION

The results demonstrate that the systems according to the present invention have the ability to be used for measuring seed spacing and seeding depth, of corn especially, on row crop planters. These two seed placement parameters are important to growers as it allows them to determine final plant population and potential yield. Having the ability to understand real-time seeding depth and spacing allows operators to adjust planter settings on the go. At present, seeding depth is measured manually by digging individual plants locating the seed then measure the distance to the ground. This process requires a lot of manpower and is prone to errors. Moreover, simply digging a couple of plants may not be enough to correctly assess an entire field as it requires multiple strips equivalent to hundreds of plants to represent the seeding depth for the whole field. Likewise, plant spacing is currently being measured by laying measuring tape and recording the cumulative spacing. Usually, plant spacing and seed spacing are used interchangeably as seeds are assumed to have been spaced uniformly during planting. However, in some cases where non-emergence due to soil compaction and non-germination of seeds occur, seed spacing and plant spacing could be different. Thus, one way to understand planter performance is to measure both seed spacing and plant spacing. The developed system is capable of capturing real-time images of seeds planted during planting and can be used to generate a stitched image of successive images. The generated stitched image was used to calculate seed spacing where it resulted in an RMSE of 0.63 and an $R^2$ of 0.87. Likewise, recorded depth was within a tolerance of +/−6.5 mm from measured seeding depth suggesting the system can measure real-time seeding depths accurately. Furthermore, the system was able to record GPS coordinates of individual images which can be used to map planted seeds. The data collected allows real-time measurement of the singulation performance, seed placement accuracy, and seed location, which may be used to optimize planter performance across the field and lead to more uniform plant stand and population, and improved yield.

REFERENCES

AGCO Corp. (2015). The art and science of planting performance. Retrieved from http://www.white-planters-.com/assets/pdf/white-planters-the-art-and-science-of-planting-performance.pdf Alessi, J. & Power, J. F. (1971). Corn emergence in relation to soil temperature and seeding depth. Agronomy Journal, Vol. 63.

Barbedo, A. J. (2013). Digital image processing techniques for detecting, quantifying and classifying plant diseases. SpringerPlus, 2(1), 1-12. doi:10.1186/2193-1801-2-660

Blasco. J., Jose V. Benlloch, Manuel Agusti, Enrique Molto. (1999). Machine vision for precise control of weeds. Proc. SPIE 3543, Precision Agriculture and Biological Quality. http://dx.doi.org/10.1117/12.336897

Doerge, T., T. Hall, D. Gardner, 2002. New research confirms benefits of improved plant spacing sensing in corn. Crop Insights Vol. 12, No. 2.Pioneer Hi-Bred Int'l.

Ghosh, D. & Kaabouch, N. (2016). A survey on image mosaicking techniques. Journal of Visual Communication and Image Representation. 34 (1-11). https://doi.org/10.1016/j.jvcir.2015.10.014

Hetzroni, A., G. E. Miles, B. A. Engel, P. A. Hammer R. X. Latin (1994). Machine vision monitoring of plant health. Advances in Space Research.14 (11). https://doi.org/10.1016/0273-1177(94)90298-4

Jain, P. M. & Shandliya, V. K. (2013). A review paper on various approaches for image mosaicing. Int. Journal of Computational Engineering Research. Vol 3(4).

Kacira, M. & P. P. Ling. (2001). Design and development of an automated and non-contact sensing system for continuous monitoring of plant health and growth. Trans. ASAE, 44(4), 989-996. doi:10.13031/2013.6231

Kim Chim B., Omara, P., Macnack, N., Mullock, J., Dhital, S. & Raun, W. (2014). Effect of seed distribution and population on maize grain yield. Int. Journal of Agronomy. http://dx.doi.org/10.1155/2014/125258.

Krall, J. M., H. A. Esechie, R. J. Raney, S. Clark, G. TenEyck, M. Lundquist, N. E. Humburg, L. S. Axthelm, A. D. Dayton, and R. L. Vanderlip (1977). Influence of Within-row Variability in Plant Spacing on Corn Grain Yieldl. Agron. J. 69:797-799. doi:10.2134/agronj1977.00021962006900050016x Knappenberger, T. & Koller, K. (2012). Spatial assessment of the correlation of seeding depth with emergence and yield of corn. Precision Agric. 13:163-180. DOi 10.1007/s11119-011-9235-4.

Lowe, D. G. (2004). Distinctive image features from scale-invariant keypoints. Int. J. Comput. Vis., 60 pp. 91-110

McCarthy, C. L., Hancock, N. H., & Raine, S. R. (2010). Applied machine vision of plants: A review with implications for field deployment in automated farming operations. Intelligent Service Robotics, 3(4), 209-217. doi:10.1007/s11370-010-0075-2

Nielsen R. L. (2001). Stand establishment variability in corn. Dept. of Agronomy publication #AGRY-91-01. Retrieved from https://www.agry.purdue.edu/ext/pubs/AGRY-91-01_v5.pdf Nakarmi, A. D., & Tang, L. (2012). Automatic inter-plant spacing sensing at early growth stages using a 3D vision sensor. Computers and Electronics in Agriculture, 82, 23-31. doi:10.1016/j.compag.2011.12.011

Nejati, H., Azifimar, Z., & Zamani, M. (2008). Using fast fourier transform for weed detection in corn fields. Int. Conf. on Systems, Man and Cybernetics. Oct. 12-15, 2008. DOI: 10.1109/ICSMC.2008.4811448

Prados, R. (2014). Image Blending Techniques and their Application in Underwater Mosaicing. Springer Briefs in Computer Science, DOI: 10.1007/978-3-319-05558-9_2.

Renuka, D. (2016). Image mosaicing using phase correlation and feature based approach: A review. International Journal of Engineering Research, 4 (1).

Sanchiz, J. M., Pla, F. Marchant, J. A & Brivot, R. (1996). Structure for motion techniques applied to crop field mapping. Image and Vision Computing, 14.p. 353-363.

Shrestha, D. S., Steward, B. L., & Birrell, S. J. (2004). Video processing for early stage maize plant detection. Biosystems Engineering, 89(2), 119-129. doi:10.1016/j.biosystemseng.2004.06.007

Shrestha, D. S. & B. L. Steward. (2003). Automatic corn plant population measurement using machine vision. Trans. ASAE, 46(2), 559. doi:10.13031/2013.12945

Tang, L. & L. F. Tian. (2008). Real-time crop row image reconstruction for automatic emerged corn plant spacing measurement. Trans. ASABE, 51(3), 1079-1087. doi: 10.13031/2013.24510

Tang, L., L. Tian, & B. L. Steward. (2000). Color image segmentation with genetic algorithm for in-field weed sensing. Trans. ASAE, 43(4), 1019. doi:10.13031/2013.2970

Thomison, P., Jeschke, M., & Butzen, S. (2012). Planting depth effects on corn stand and grain yield. Retrieved from https://www.pioneer.com/home/site/us/agronomy/library/planting-depth-and-stand-yields USDA-ERS (2017). 2017 Farm sector income forecast. Retrieved from https://www.ers.usda.gov/topics/farm-economy/farm-sector-income-finances/farm-sector-income-forecast/

USDA(2017a). World agricultural supply and demand estimates. Retrieved from https://www.usda.gov/oce/commodity/wasde/latest.pdf USDA (2017b). USDA Agricultural projections to 2026. Retrieved from https://www.ers.usda.gov/webdocs/publications/82539/oce-2017-1.pdf?v=4278

We claim:

1. A method of measuring planting characteristics of seeds comprising:
    creating a furrow in the ground and depositing a first seed within the furrow;
    using a camera to capture a first image comprising the first seed within the furrow;
    using a GPS unit positioned in vertical alignment with the camera to detect and record the geographic coordinates of the center of the first image;
    depositing a second seed within the furrow;
    using the camera to capture a second image comprising the second seed within the furrow;
    using the GPS unit to detect and record the geographic coordinates of the center of the second image;
    using a processor to stitch the first and second images together to form a stitched image, the stitched image comprising the first and second seeds;
    analyzing the stitched image to determine the number of pixels between the first and second seeds and to convert the number of pixels into a basic unit of measurement using a pixel-to-distance calibration factor thereby determining the spacing between the first and second seeds.

2. The method of claim 1, wherein the method further comprises using the geographic coordinates of the centers of the first and second images to determine the geographic coordinates of the first and second seeds.

3. The method of claim 1, wherein the method further comprises:
    using a light section sensor positioned in facing relationship to the furrow to detect the deepest portion of the furrow contained within the first and second images captured by the camera and the ground adjacent to the furrow; and
    calculating the difference between the deepest portion of the furrow and the ground adjacent to the furrow to determine a depth of the seed in the ground.

4. The method of claim 3, wherein the method further comprises:
    using a potentiometer mounted on a device that is creating the furrow and depositing the seeds to provide information to the processor corresponding to a vertical displacement of the seed planting device during planting operations and to a unit increase or decrease in the measuring position of the light section sensor.

5. The method of claim 1, wherein the step of creating a furrow is performed with a planter row unit.

6. The method of claim 5, wherein the planter row unit comprises one or more seed openers operable to create the furrow, one or more gauge wheels operable to control the depth of the furrow created by the one or more seed openers, one or more seed tubes operable to deposit the seed into the furrow, and one or more closing wheels operable to close the furrow following deposit of the seed in the furrow, the camera being positioned on the planter row unit in between the one or more gauge wheels and the one or more closing wheels.

7. The method of claim 6, wherein the camera is attached to the seed planting device and configured to capture an image of the seed in the furrow prior to closing of the furrow, and wherein the GPS unit is mounted on the planter row unit directly over the camera.

8. The method of claim 1, further comprising using a light source to illuminate the furrow and seeding during image capture by the camera.

9. The method of claim 8, wherein the light source comprises one or more LEDs.

* * * * *